(12) United States Patent
Flick et al.

(10) Patent No.: US 6,676,615 B2
(45) Date of Patent: Jan. 13, 2004

(54) WIRELESS MASSAGE DEVICE FOR A VEHICLE AND ASSOCIATED METHODS

(75) Inventors: Kenneth E. Flick, Douglasville, GA (US); Michael Lee, Taipei (TW)

(73) Assignee: Omega Patents, L.L.C., Douglasville, GA (US)

( * ) Notice: Subject to any disclaimer, the term of this patent is extended or adjusted under 35 U.S.C. 154(b) by 0 days.

(21) Appl. No.: 09/956,473

(22) Filed: Sep. 19, 2001

(65) Prior Publication Data

US 2002/0107458 A1 Aug. 8, 2002

Related U.S. Application Data

(60) Provisional application No. 60/237,022, filed on Sep. 29, 2001.

(51) Int. Cl.$^7$ .............................. A61H 1/00; A61H 23/02
(52) U.S. Cl. .............................. 601/57; 601/148; 601/70
(58) Field of Search .............................. 601/46, 47, 49, 601/53, 54, 67, 69, 70, 148

(56) References Cited

U.S. PATENT DOCUMENTS

| 3,678,923 | A | | 7/1972 | Oetinger | |
| 5,637,076 | A | * | 6/1997 | Hazard et al. | 601/5 |
| 5,689,261 | A | * | 11/1997 | Mehta et al. | 341/173 |
| 5,787,528 | A | * | 8/1998 | Antinori | 5/616 |
| 5,807,287 | A | * | 9/1998 | Cheng | 601/60 |
| 6,077,238 | A | * | 6/2000 | Chung | 601/57 |
| 6,087,942 | A | * | 7/2000 | Sleichter et al. | 340/576 |
| 6,098,000 | A | | 8/2000 | Long et al. | |
| 6,106,576 | A | * | 8/2000 | Fromson | 318/16 |
| 6,290,661 | B1 | * | 9/2001 | Cutler et al. | 601/49 |

* cited by examiner

Primary Examiner—Danton D. DeMille
(74) Attorney, Agent, or Firm—Allen, Dyer, Doppelt, Milbrath & Gilchrist, P.A.

(57) ABSTRACT

A user-controllable massage device is for a vehicle seat that operates via a wireless communications link. The massage device may include a plurality of vibration transducers to be positioned adjacent the vehicle seat, a wireless receiver, and a power controller connected to the wireless receiver for selectively powering the plurality of vibration transducers based upon signals received from the wireless receiver. The massage device may also include a wireless remote controller to be operated by the user for communicating with the wireless receiver to selectively operate the plurality of vibration transducers. The remote controller may transmit a unique code which can be learned by the power controller.

41 Claims, 3 Drawing Sheets

WIRELESS MASSAGE DEVICE FOR A VEHICLE AND ASSOCIATED METHODS

RELATED APPLICATION

This application is based upon prior filed copending provisional application Serial No. 60/237,022 filed Sep. 29, 2001, the entire subject matter of which is incorporated herein by reference.

FIELD OF THE INVENTION

The present invention relates to vehicles, and, more particularly, to a user-controllable massage device for a user in a vehicle seat and related methods.

BACKGROUND OF THE INVENTION

Motor vehicles are widely used to transport people and goods on both short and long trips. Driver comfort, in particular, is especially important as driving distances increase. Fatigue associated with long vehicle trips may occur even with high quality seats. Moreover, some drivers may have health problems, particularly back problems, that can make sitting, as when driving a vehicle, difficult.

Massage units have been developed to increase driver comfort. For example, U.S. Pat. No. 5,462,515 to Tseng discloses a massage device for a vehicle including a pair of motors in both the seat back and seat bottom portions. A control box that may be held in the user's hand is hardwired to the motors to control their operation. Similarly, U.S. Pat. No. 6,087,942 to Sleichter, III et al. discloses a pad for a car seat including motorized vibrators in both the seat back and seat bottom portions and a remote control also hardwired to the pad.

Unfortunately, such massage devices including hardwired control units may significantly increase the complexity and cost of installation. A wire control cable must be routed typically from an under-seat power controller to the remote control unit. In addition, a cable extending within the interior of the vehicle may be awkward for driver use, and may also be susceptible to damage.

To further address driver comfort, an inflatable bladder has been used to provide selectable lumber support. For example, U.S. Pat. No. 5,429,585 to Liang discloses a cushion having a seat back portion that includes an adjustable air pouch for supporting a user's lumbar region, a heating device, and a vibration device. An external control box is hardwired to the cushion for controlling the air pouch, heating device, and vibration device. Accordingly, even this more sophisticated massage unit with adjustable lumbar support suffers shortcomings associated with the hardwired control connection.

SUMMARY OF THE INVENTION

In view of the foregoing background, it is therefore an object of the present invention to provide a massage device and associated method to increase driver comfort without the shortcomings of a hardwired control connection.

This and other objects, features and advantages in accordance with the present invention are provided by a user-controllable massage device for a vehicle seat that operates via a wireless communications link. More particularly, the massage device may include a plurality of vibration transducers to be positioned adjacent the vehicle seat, a wireless receiver, and a power controller connected to the wireless receiver for selectively powering the plurality of vibration transducers based upon signals received from the wireless receiver. The massage device may also include a wireless remote controller to be operated by the user for communicating with the wireless receiver to selectively operate the plurality of vibration transducers. Accordingly, the clutter, potential for damage to a cable, and installation complexity associated with a hardwired cable control arrangement are avoided.

In some embodiments, the wireless remote controller may transmit a unique code. In addition, the power controller is preferably switchable to a learning mode for learning the unique code of the wireless remote controller so that the wireless remote controller is then an authorized wireless remote controller. Accordingly, interference from another nearby unit is avoided, yet a new remote controller can be readily learned and then used.

The wireless receiver and the wireless remote controller may operate at radio frequencies (RF), for example. The wireless remote controller may comprise a portable housing, and wireless transmitter circuitry and a battery carried by the housing. Additionally, the wireless remote controller may further comprise power terminals to be connected to the vehicle's electrical power, if so desired, in certain installations.

The plurality of vibration transducers may include a first array of spaced-apart vibration transducers, which may be positioned adjacent a seat back of the vehicle seat. The first array of vibration transducers may be arranged into a pair of columns and at least three rows, for example. The plurality of vibration transducers may include a second array of spaced-apart vibration transducers that can be positioned adjacent a seat bottom. The second array may comprise a pair of columns and at least one row.

Each vibration transducer may be switched between on and off states and/or the user may control the magnitude of vibrations. Each vibration transducer may include an electric motor driving an eccentric load. Additionally, each vibration transducer may further comprise a seat mounting substrate connected to the electric motor to facilitate mounting adjacent the vehicle seat. An adjustable lumbar support device may be positioned adjacent a seat back of the vehicle seat and connected to the power controller to be selectively operable by the wireless remote controller.

Another aspect of the invention relates to a method for installing and operating a user-controllable massage device. More particularly, the method may include installing a plurality of vibration transducers adjacent the vehicle seat, providing a wireless receiver and a power controller connected thereto for selectively powering the plurality of vibration transducers based upon signals received from the wireless receiver, and using a wireless remote controller for communicating with the wireless receiver to selectively operate the plurality of vibration transducers to thereby provide massage action to the user at the vehicle seat.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
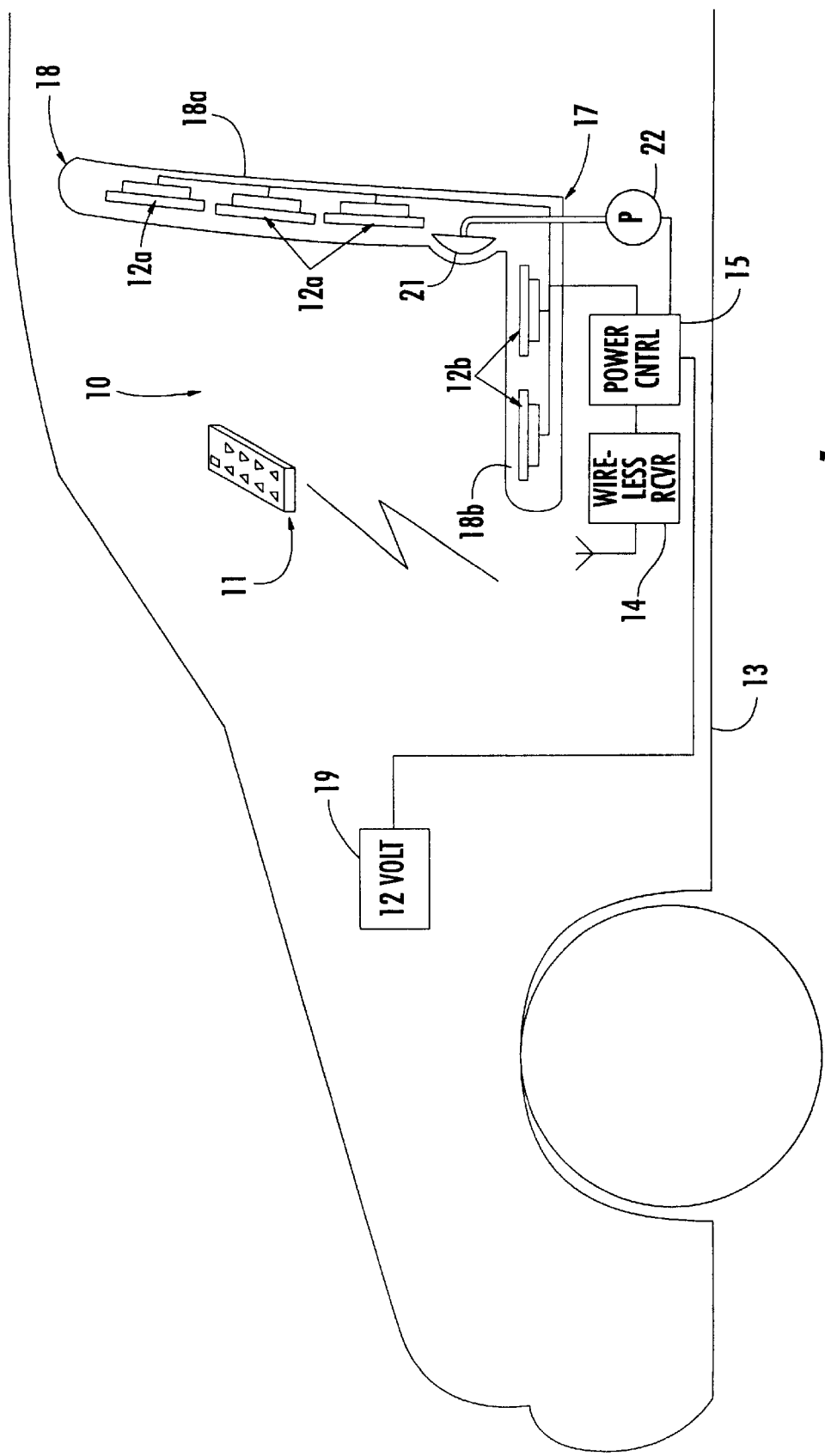
FIG. 1 is a schematic diagram of a user-controllable massage device for a vehicle seat in accordance with the present invention.

Referring now to FIG. 1, the user-controllable massage device 10 in accordance with the invention is first described. The massage device 10 illustratively includes a plurality of vibration transducers 12a, 12b positioned adjacent a vehicle seat 18 within a vehicle 13. The vehicle seat 18 illustratively includes a seat back 18a and a seat bottom 18b adjacent the seat back. A first array of transducers 12a is arranged adjacent the seat back and may, for example, include a pair of columns and at least three rows. A second array of transducers 12b is positioned adjacent the seat bottom 12b and may include, for example, a pair of columns and at least one row.

The device 10 also includes a wireless receiver 14, and a power controller 15 connected to the wireless receiver for selectively powering the plurality of vibration transducers 12a, 12b based upon signals received from the wireless receiver. Power for the vibration transducers 12a, 12b is delivered from the vehicle electrical system, such as the battery and/or alternator, as schematically illustrated by the block labeled 19.

The massage device 10 also illustratively includes a wireless remote controller 11 to be operated by the user for communicating with the wireless receiver 14 to selectively operate the vibration transducers 12a, 12b. The massage device 10 advantageously reduces the clutter, the potential for damage to the cable, and the installation complexity associated with hardwired or cable systems.

The user-controllable massage device 10 may optionally include an adjustable lumbar support device 17. The illustrated lumbar support device 17 includes an inflatable bladder 21 and a controllable air pump 22 connected to the bladder. The air pump 22 can supply air to the bladder 21 to extend it outwardly for additional lumbar support, as will be readily appreciated by those skilled in the art. In addition, a pressure relief valve, not shown, and associated with the air pump 22 can be activated to release air pressure from the bladder 21 to reduce lumbar support as will also be appreciated by those skilled in the art. The lumbar support device 17 may also be selectively operable by the wireless remote controller 11.

Figure 2:
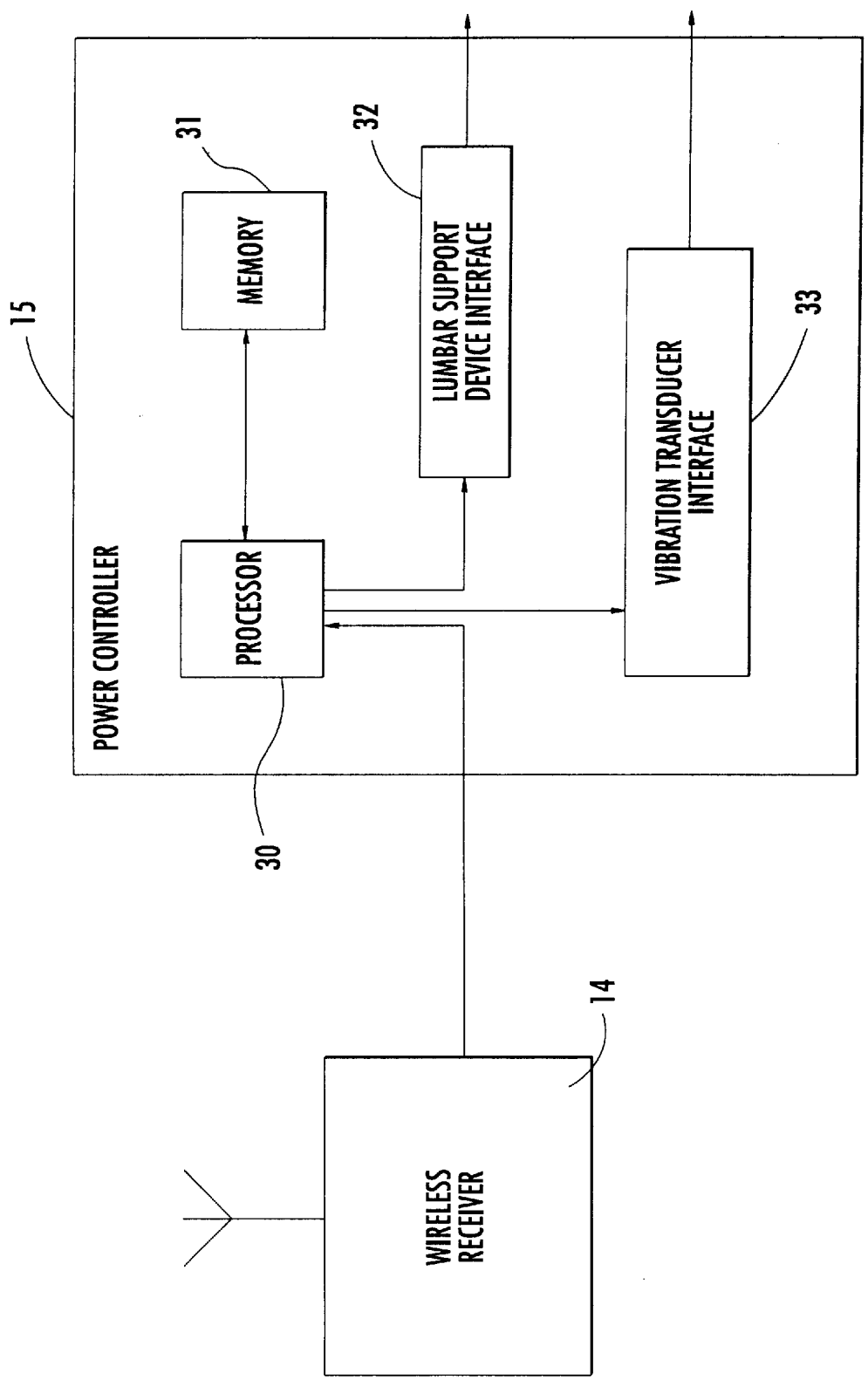
FIG. 2 is a more detailed schematic diagram of a portion of the massage device as shown in FIG. 2.

Referring now additionally to FIG. 2, additional features of the massage device 10 are now described. The power controller 15 illustratively includes a processor 30 and a memory 31 connected thereto. In addition, the processor 30 is illustratively connected to a lumbar support device interface 32, and a vibration transducer interface 33.

The wireless remote controller 11 may transmit a unique code and the power controller 15 is preferably switchable to a learning mode for learning the unique code of the wireless remote controller so that the wireless remote controller is an authorized wireless remote controller. In other words, the unique code can be learned into the memory 31, as will be appreciated by those skilled in the art. This learned code is compared against an incoming code to determine if the remote controller 11 is authorized to operate the power controller 15. Interference from another nearby unit is avoided, yet a new remote controller can be readily used.

Figure 3:
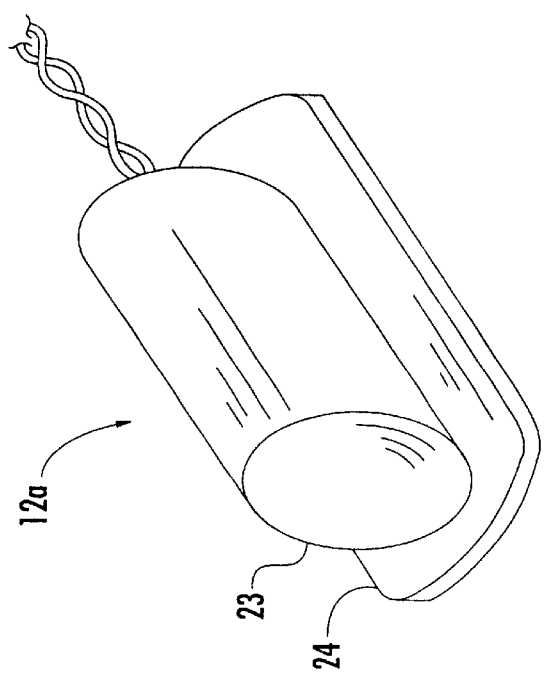
FIG. 3 is a perspective view of a vibration transducer as shown in FIG. 1.

As shown in FIG. 3, each vibration transducer 12a may include an electric motor 23 driving an eccentric load, and a seat mounting substrate 24 carrying the motor. The seat mounting substrate 24 may facilitate positioning in the seat back 18a (or seat bottom 18b) as will be appreciated by those skilled in the art. Each vibration transducer 12a may be switched between on and off states and/or the magnitude of vibrations may be controlled by the user.

Figure 4:
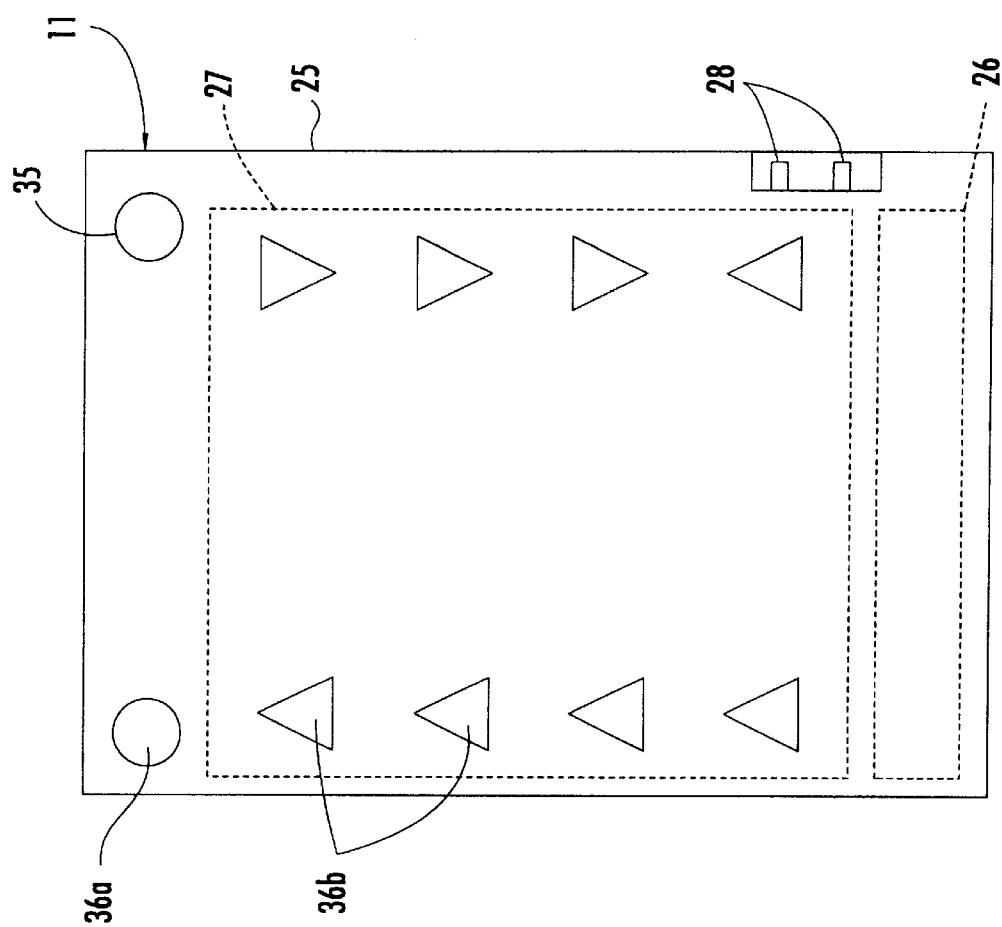
FIG. 4 is a top plan view of the wireless remote controller of the massage device as shown in FIG. 1.

Referring now additionally to FIG. 4, other aspects of the wireless remote controller 11 are described. The wireless receiver 14 and the wireless remote controller 11 may operate at radio or infrared frequencies, for example. The wireless remote controller 11 includes a portable housing 25 which contains wireless transmitter circuitry 27 and a battery 26 for powering the wireless transmitter circuitry. One or more visual indicators 35 may be carried by the housing 25. In addition, one or more user operable switches 36a, 36b may also be carried by the housing 25 as shown in the illustrated embodiment of the wireless remote controller 11.

The wireless remote controller 11 may further include power terminals 28 to be connected to the vehicle's electrical power source 19, if so desired. For example, in some installations, it may be readily possible to connect the power terminals 28 to nearby wiring in the vehicle. Even in these embodiments, the wireless link still facilitates installation in the vehicle 13 without needing a cable connection between the remote controller 11 and the power controller 15.

Another aspect of the invention relates to a method for installing and operating the user-controllable massage device 10. The method preferably includes installing a plurality of vibration transducers 12a, 12b adjacent the vehicle seat 18, providing a wireless receiver 14 and a power controller 15 connected to the wireless receiver for selectively powering the plurality of vibration transducers based upon signals received from the wireless receiver 14, and using a wireless remote controller 11 to communicate with the wireless receiver to permit the user to selectively operate the plurality of vibration transducers.

The wireless remote controller 11 preferably transmits a unique code, and the method may further include switching the power controller 15 to a learning mode for learning the unique code of the wireless remote controller so that the wireless remote control unit is an authorized wireless remote controller.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A massage system for a vehicle user, the massage system comprising:
    a vehicle seat;
    a user-controllable massage device comprising
        a plurality of vibration transducers to be positioned adjacent said vehicle seat,
        a wireless receiver,
        a power controller connected to said wireless receiver for selectively powering said plurality of vibration transducers based upon signals received from said wireless receiver, and
        a wireless remote controller to be operated by the user for communicating with said wireless receiver to selectively operate said plurality of vibration transducers; and an adjustable lumbar support device to be positioned adjacent a seat back of the vehicle seat and connected to said power controller to be selectively operable by said wireless remote controller.

2. A massage system according to claim 1 wherein said wireless remote controller transmits a unique code; and wherein said power controller is switchable to a learning mode for learning the unique code of the wireless remote controller so that the wireless remote control unit is an authorized wireless remote controller.

3. A massage system according to claim 1 wherein said wireless receiver and said wireless remote controller operate at radio frequencies.

4. A massage system according to claim 1 wherein said wireless remote controller comprises a portable housing and wireless transmitter circuitry contained therein.

5. A massage system according to claim 4 wherein said wireless remote controller further comprises a battery carried by said housing for powering said wireless transmitter circuitry.

6. A massage system according to claim 4 wherein said wireless remote controller further comprises power terminals to be connected to vehicle electrical power for powering said wireless transmitter circuitry.

7. A massage system according to claim 1 wherein said plurality of vibration transducers comprises a first array of spaced-apart vibration transducers to be positioned adjacent a seat back of the vehicle seat.

8. A massage system according to claim 7 wherein said plurality of vibration transducers comprises a second array of spaced-apart vibration transducers to be positioned adjacent a seat bottom of the vehicle seat.

9. A massage system according to claim 1 wherein each vibration transducer is switchable between on and off states.

10. A massage system according to claim 1 wherein each vibration transducer has a controllable vibration magnitude.

11. A massage system according to claim 1 wherein each vibration transducer comprises an electric motor driving an eccentric load.

12. A massage system according to claim 11 wherein each vibration transducer further comprises a seat mounting substrate connected to said electric motor.

13. A user-controllable massage device for a vehicle seat, the user-controllable massage device comprising:
    a plurality of vibration transducers to be positioned adjacent at least a seat back of the vehicle seat;
    a wireless radio frequency (RF) receiver;
    a power controller connected to said wireless RF receiver for selectively powering said plurality of vibration transducers based upon signals received from said wireless RF receiver; and
    a wireless RF remote controller to be operated by the user for communicating with said wireless RF receiver to selectively operate said plurality of vibration transducers, said wireless RF remote controller transmitting a unique code;
    said power controller being switchable to a learning mode for learning the unique code of the wireless RF remote controller so that said wireless RF remote control unit is an authorized wireless RF remote controller.

14. A user-controllable massage device according to claim 13 wherein said wireless RF remote controller comprises a portable housing and wireless RF transmitter circuitry contained therein.

15. A user-controllable massage device according to claim 13 wherein said wireless RF remote controller further comprises a battery carried by said housing for powering said wireless RF transmitter circuitry.

16. A user-controllable massage device according to claim 13 wherein said wireless RF remote controller further comprises power terminals to be connected to vehicle electrical power for powering said wireless RF transmitter circuitry.

17. A user-controllable massage device according to claim 13 wherein said plurality of vibration transducers comprises a first array of spaced-apart vibration transducers to be positioned adjacent a seat back of the vehicle seat.

18. A user-controllable massage device according to claim 17 wherein said plurality of vibration transducers comprises a second array of spaced-apart vibration transducers to be positioned adjacent a seat bottom of the vehicle seat.

19. A user-controllable massage device according to claim 13 wherein each vibration transducer is switchable between on and off states.

20. A user-controllable massage device according to claim 13 wherein each vibration transducer has a controllable vibration magnitude.

21. A user-controllable massage device according to claim 13 wherein each vibration transducer comprises an electric motor driving an eccentric load.

22. A user-controllable massage device according to claim 21 wherein each vibration transducer further comprises a seat mounting substrate connected to said electric motor.

23. A user-controllable massage device according to claim 13 further comprising an adjustable lumbar support device to be positioned adjacent a seat back of the vehicle seat and connected to said power controller to be selectively operable by said wireless remote controller.

24. A user-controllable massage device for a vehicle seat, the user-controllable massage device comprising:
    a plurality of vibration transducers to be positioned adjacent at least a seat back of the vehicle seat, each vibration transducer comprising a seat mounting substrate and an electric motor carried thereby;
    a wireless radio frequency (RF) receiver;
    a power controller connected to said wireless RF receiver for selectively powering said plurality of vibration transducers based upon signals received from said wireless RF receiver;
    a wireless RF remote controller to be operated by the user for communicating with said wireless RF receiver to selectively operate said plurality of vibration transducers; and
    an adjustable lumbar support device to be positioned adjacent a seat back of the vehicle seat and connected to said power controller to be selectively operable by said wireless RF remote controller.

25. A user-controllable massage device according to claim 24 wherein each electric motor drives an eccentric load.

26. A user-controllable massage device according to claim 24 wherein said wireless RF remote controller transmits a unique code; and wherein said power controller is switchable to a learning mode for learning the unique code of the wireless RF remote controller so that the wireless RF remote control unit is an authorized wireless RF remote controller.

27. A user-controllable massage device according to claim 24 wherein said wireless RF remote controller comprises a portable housing and wireless RF transmitter circuitry contained therein.

28. A user-controllable massage device according to claim 27 wherein said wireless RF remote controller further comprises a battery carried by said housing for powering said wireless RF transmitter circuitry.

29. A user-controllable massage device according to claim 27 wherein said wireless RF remote controller further comprises power terminals to be connected to vehicle electrical power for powering said wireless RF transmitter circuitry.

30. A user-controllable massage device according to claim 24 wherein said plurality of vibration transducers comprises a first array of spaced-apart vibration transducers to be positioned adjacent a seat back of the vehicle seat.

31. A user-controllable massage device according to claim 30 wherein said plurality of vibration transducers comprises a second array of spaced-apart vibration transducers to be positioned adjacent a seat bottom of the vehicle seat.

32. A user-controllable massage device according to claim 24 wherein each vibration transducer is switchable between on and off states.

33. A user-controllable massage device according to claim 24 wherein each vibration transducer has a controllable vibration magnitude.

34. A method for providing massage action to a user in a vehicle seat, the method comprising:

installing a plurality of vibration transducers adjacent the vehicle seat;

providing a wireless receiver and a power controller connected thereto for selectively powering the plurality of vibration transducers based upon signals received from the wireless receiver;

using a wireless remote controller for communicating with the wireless receiver to permit the user to selectively operate the plurality of vibration transducers to thereby provide massage action to the user at the vehicle seat; and installing a lumbar support device adjacent the vehicle seat and controlling the lumbar support device using the wireless remote controller.

35. A method according to claim 34 wherein the wireless remote controller transmits a unique code, and further comprising switching the power controller to a learning mode for learning the unique code of the wireless remote controller so that the wireless remote control unit is an authorized wireless remote controller.

36. A method according to claim 34 wherein the wireless receiver and the wireless remote controller operate at radio frequencies.

37. A method according to claim 34 wherein installing comprises installing a first array of spaced-apart vibration transducers adjacent a seat back of the vehicle seat.

38. A method according to claim 37 wherein installing further comprises installing a second array of spaced-apart vibration transducers positioned adjacent a seat bottom of the vehicle seat.

39. A method for providing massage action to a user in a vehicle seat, the method comprising:

installing a plurality of vibration transducers to adjacent the vehicle seat;

providing a wireless radio frequency (RF) receiver and a power controller connected thereto for selectively powering the plurality of vibration transducers based upon signals received from said wireless RF receiver;

using a wireless RF remote controller to transmit a unique code for communicating with the wireless RF receiver to permit the user to selectively operate the plurality of vibration transducers; and switching the power controller to a learning mode for learning the unique code of the wireless RF remote controller so that the wireless RF remote control unit is an authorized wireless RF remote controller.

40. A method according to claim 39 wherein installing comprises installing a first array of spaced-apart vibration transducers adjacent a seat back of the vehicle seat.

41. A method according to claim 40 wherein installing further comprises installing a second array of spaced-apart vibration transducers positioned adjacent a seat bottom of the vehicle seat.

* * * * *

UNITED STATES PATENT AND TRADEMARK OFFICE
CERTIFICATE OF CORRECTION

PATENT NO. : 6,676,615 B2  Page 1 of 1
DATED : January 13, 2004
INVENTOR(S) : Kenneth E. Flick and Michael Lee It is certified that error appears in the above-identified patent and that said Letters Patent is hereby corrected as shown below:

<u>Title page,</u>
Item [60], Related U.S. Application Data, delete "Sep. 29, 2001" insert
-- Sep. 29, 2000 --
Item [56], References Cited, U.S. PATENT DOCUMENTS, insert the following:

| | | | |
|---|---|---|---|
| -- 5,022,384 | 06/11/91 | Freels et al. | 128/33 |
| 5,188,096 | 02/23/93 | Yoo | 128/33 |
| 5,429,585 | 07/04/95 | Liang | 601/15 |
| 5,426,515 | 10/31/95 | Tseng | 601/57 |
| 5,816,653 | 10/6/98 | Benson | 297/284 |
| 5,713,832 | 02/3/98 | Jain | 601/49 |
| 5,967,608 | 12/19/99 | Van Sickle | 297/284 |
| 6,001,073 | 12/14/99 | Schmidt et al. | 601/72 |
| 6,007,151 | 12/28/99 | Benson | 297/284 |
| 6,039,702 | 03/21/00 | Cutler et al. | 601/15 -- |

<u>Column 1,</u>
Lines 7-8, delete "Sep. 29, 2001," insert -- Sept. 29, 2000, --

Signed and Sealed this

Twenty-seventh Day of April, 2004

JON W. DUDAS
*Acting Director of the United States Patent and Trademark Office*